United States Patent [19]

Ishihara

[11] Patent Number: 5,282,548
[45] Date of Patent: Feb. 1, 1994

[54] AUTOMATIC COLOR PELLET SELECTING AND SUPPLYING APPARATUS FOR INJECTION MOLDING MACHINE

[75] Inventor: Kiyomitsu Ishihara, Toyama, Japan

[73] Assignee: Yoshida Kogyo K. K., Tokyo, Japan

[21] Appl. No.: 877,228

[22] Filed: May 1, 1992

[30] Foreign Application Priority Data

May 2, 1991 [JP] Japan .................. 3-130346

[51] Int. Cl.$^5$ ............................................. B67D 5/08
[52] U.S. Cl. ........................................ 222/55; 222/64
[58] Field of Search ............... 222/14, 52, 55, 64, 222/129, 132, 144.5, 145; 241/38, 41, 101.4, 186.4

[56] References Cited

U.S. PATENT DOCUMENTS 4,955,550  9/1990  Satake et al. .
5,110,521  5/1992  Moller .................. 222/55

FOREIGN PATENT DOCUMENTS 0318170  5/1989  European Pat. Off. .
0334092  9/1989  European Pat. Off. .
2272926  12/1975  France .

Primary Examiner—Jesus D. Sotelo
Attorney, Agent, or Firm—Hill, Steadman & Simpson

[57] ABSTRACT

An apparatus for automatically selecting one from color pellets of different colors and automatically supplying it to an injection molding machine, comprises: an auxiliary hopper connected to a pellet supply portion of the injection molding machine via an automatic change-over valve; a negative pressure device for causing the auxiliary hopper, at the upstream side chamber, to be under negative pressure; a pellet feed pipe connected to the upstream side chamber of the auxiliary hopper; and storage tanks for storing the respective color pellets, each storage tank being connected to the pellet feed pipe via a respective automatic change-over valve.

4 Claims, 3 Drawing Sheets

AUTOMATIC COLOR PELLET SELECTING AND SUPPLYING APPARATUS FOR INJECTION MOLDING MACHINE

BACKGROUND OF THE INVENTION

1. Field of the Invention

This invention relates to an apparatus for automatically selecting one from color pellets of different colors and automatically supplying the selected color pellet to an injection molding machine.

2. Description of the Related Art

To realize an efficient flexible manufacturing system in obtaining polychromatic molded products by a common injection molding machine, it is currently of urgent necessity for our industry to develop an automatic selecting and supplying apparatus for automatically executing the pellet selecting operation which has conventionally been performed by hand.

One example among the few developed technologies is an automatic color pellet selecting method disclosed in Japanese Patent Publication No. 35372/1987.

According to this prior method, every time change-over of color pellets is made, a cleaning material and a selected color pellet are automatically supplied in order to an inlet of an injection molding machine from a cleaning material hopper and a number of color pellet hoppers. In response to an instruction from a control unit, the individual hoppers are revolved on a common circular track until a desired hopper arrives at the inlet of the injection molding machine. At the start of molding by a new color pellet, a cleaning material is automatically supplied into the injection molding machine from the cleaning material hopper to clean the previous old color pellet in the injection molding machine as the machine is idly operated a predetermined number of times, whereupon the new color pellet is supplied into the injection molding machine for injection molding.

With this method, although it is possible to improve operativity to a considerable extent, compared to the conventional manual operation, it requires a number of hoppers and a dedicated drive as associated parts of the injection molding machine. This restricts the number of hoppers and the size of the individual hopper so that only a limited mass of pellet and a limited number of colors can be used. Consequently, this prior method is not suitable for use in the production of coupling elements of slide fasteners, which consumes a large mass of each color pellet and needs twenty to thirty kinds of color pellets.

SUMMARY OF THE INVENTION

It is therefore a first object of this invention to provide an automatic color pellet selecting and supplying apparatus which can be easily installed on any kind of injection molding machine and which automatically selects one from many kinds of color pellets and supplies an adequate mass of each kind of color pellet.

A second object of the invention is to provide an automatic color pellet selecting and supplying apparatus which automatically cleans old color pellet in an injection molding machine every time change-over of color pellets is made.

A third object of the invention is to provide an automatic color pellet selecting and supplying apparatus which can cope with flexible manufacturing in the production of injection-molded articles.

According to this invention, there is provided an apparatus for automatically selecting one from color pellets of different colors and for automatically supplying the selected one color pellet to an injection molding machine, comprising: an auxiliary hopper adapted to be connected to an inlet of the injection molding machine and divided into two chambers by an automatic change-over valve; a negative pressure means for causing the auxiliary hopper, at the upstream side chamber, to be under negative pressure; a pellet feed pipe adapted to be connected to the upstream side chamber of the auxiliary hopper; and a number of storage tanks for storing the respective color pellets, each of the storage tanks being adapted to be connected to the pellet feed pipe via a respective automatic change-over valve.

Preferably, the auxiliary hopper has at a junction with the negative pressure means a filter. Further the downstream side chamber of the auxiliary hopper communicates with the ambient air.

In operation, When injection-molded products of another color is to be manufactured upon completion of injection molding of the previous color pellet, firstly the negative means is activated, and both the automatic change-over valve between the two chambers of the auxiliary hopper and the automatic change-over valve in one of the two chambers toward the hopper of the injection molding machine are opened to draw air into the auxiliary hopper so that the old powdery pellet stuck on the inside wall of the auxiliary hopper is exhausted therefrom via the filter under negative pressure. Thus the previous pellet in the chambers of the auxiliary hopper has been cleaned.

Subsequently, when these automatic change-over valves are closed and in turn the automatic change-over valve communicating with the storage tank for cleaning material is opened, a predetermined mass of cleaning material is sucked into the upstream side chamber of the auxiliary hopper by the negative pressure means for accumulation. Upon completion of this accumulation, the automatic change-over valve of the storage tank is closed and in turn the valve between the two chambers of the auxiliary hopper is opened, whereupon the cleaning material is supplied to the injection cylinder and then the injection molding machine is idly operated, thus cleaning the residual old pellet in the injection cylinder.

Upon termination of this cleaning, the two automatic change-over valves of the auxiliary hopper are closed and in turn the automatic change-over valve communicating with the storage tank for new pellet of different color is opened, the new pellet is sucked into the upstream side chamber of the auxiliary hopper by the negative pressure means until a predetermined mass of pellet is accumulated there, whereupon the automatic change-over valve communicating with the storage tank for the new pellet is automatically closed. At the same time the automatic change-over valve between the two chambers of the auxiliary hopper is opened to supply the new pellet to the injection cylinder so that injection molding of the new pellet can be started.

The amount of the consumed new pellet is normally detected by the level sensor located at the downstream side chamber, which is adapted to communicate with the pellet supply portion of the injection molding machine, of the auxiliary hopper; when the remaining amount of pellet is less than a predetermined value, the control unit is operated to close again the automatic change-over valve between the two chambers of the auxiliary hopper and in turn the automatic change-over valve communicating with the storage tank for the new pellet is opened so that a predetermined mass of the new pellet is fed to the downstream side chamber of the auxiliary hopper. The foregoing successive operations are repeated to continue injection molding of the new pellet until the number of molded products reaches a desired value. Then change-over of color pellets is automatically performed in the manner described above.

DETAILED DESCRIPTION

One embodiment of this invention as applied to the production-on of slide fastener chains will now be described with reference to the accompanying drawings.

Figure 1:
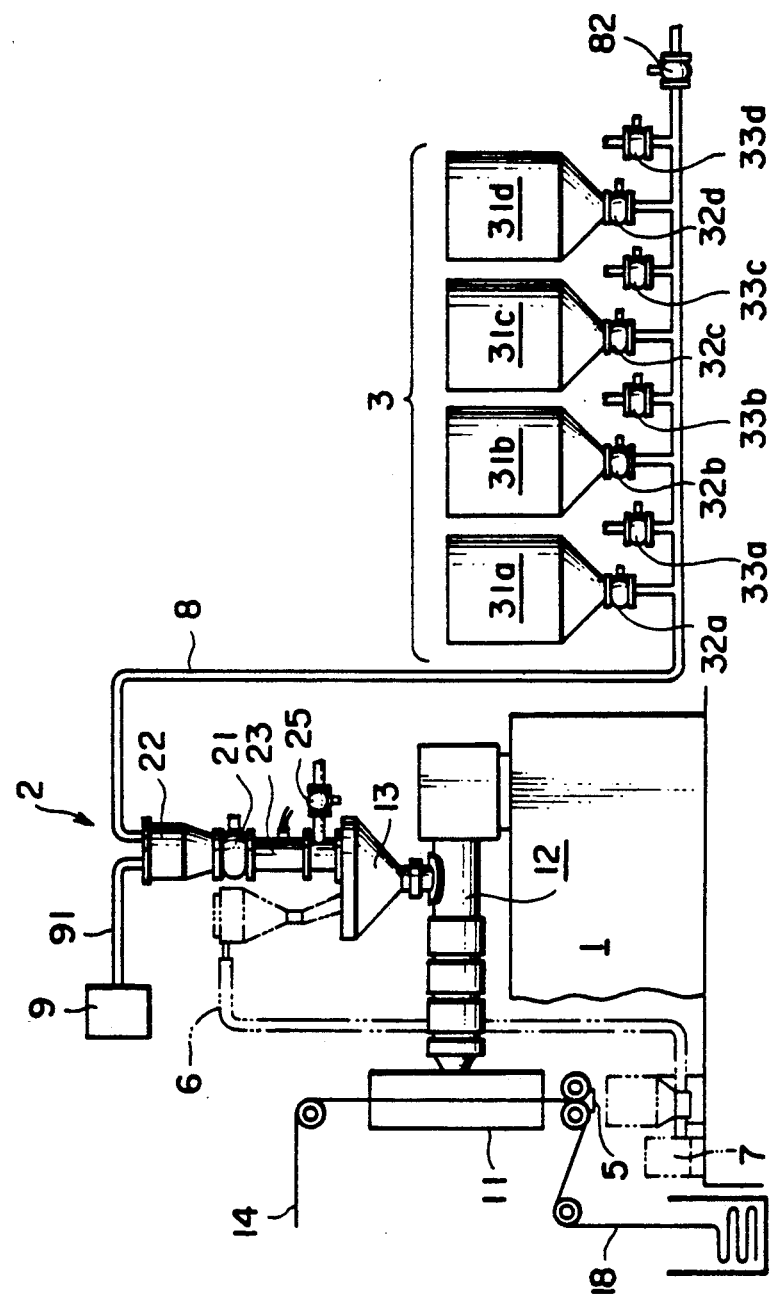
FIG. 1 is a schematic view showing an apparatus according to one embodiment of this invention as applied to a slide fastener chain manufacturing apparatus.
Figure 2:
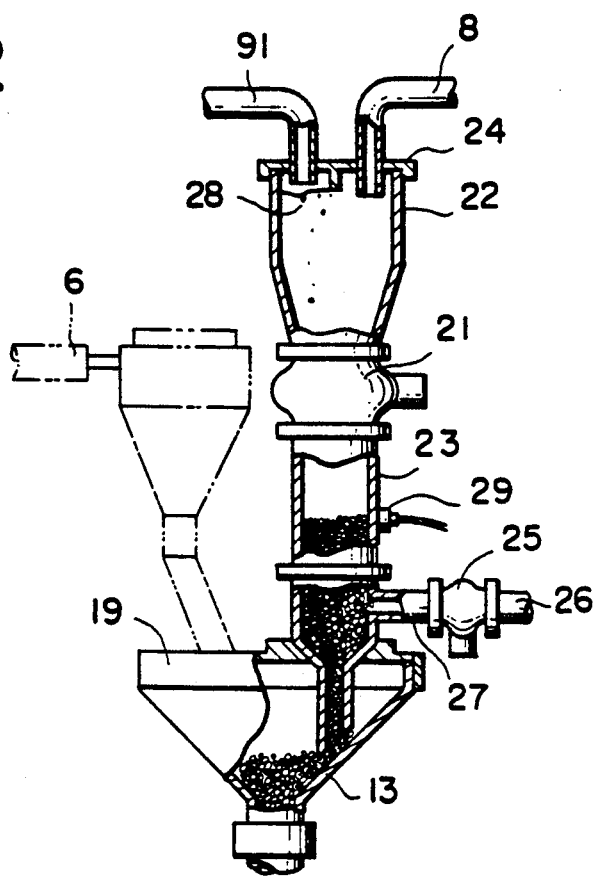
FIG. 2 is a side view, with parts broken away, of an automatic color pellet supply unit of the apparatus of FIG. 1.
Figure 3:
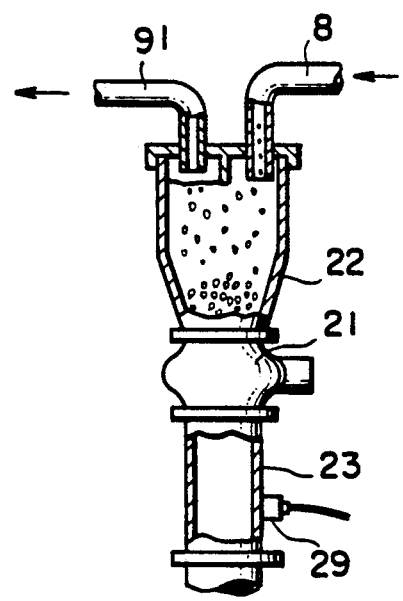
FIG. 3 shows the operation of the automatic pellet supply unit of FIG. 2.

FIG. 1 is a side view of an injection molding machine, for molding successive coupling elements on a continuous length of fastener tapes, which is equipped with an automatic color pellet selecting and supplying apparatus of this invention. FIG. 2 is a enlarged view, with parts broken away, of the automatic color pellet supply unit of the apparatus of this embodiment. FIG. 3 shows how the automatic color pellet supply unit of FIG. 2 accepts pellets.

Figure 4:
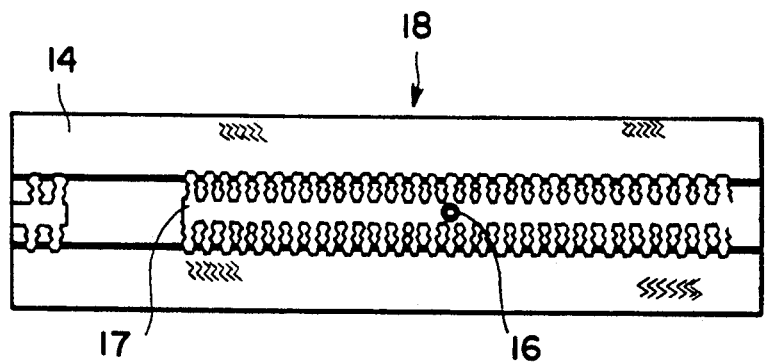
FIG. 4 is a fragmentary plan view of a slide fastener chain, showing it upon completion of molding.

In FIG. 1, reference numeral 1 designates an injection molding machine which is totally similar in construction to the conventional injection molding machine, except a mold 11. Specifically, a hopper 13 is attached to the pellet supply unit in the form of an injection cylinder 12 in which a screw movable forwardly and backwardly and rotatable at every shot by a non-illustrated drive unit is mounted. The mold 11 has in a parting surface a pair of grooves in and along which a pair of continuous fastener tapes 14 may travel. At time increments, a predetermined length of the fastener tapes is moved in and along the grooves, during which time a number of successive coupling elements are molded on the fastener tapes 14. Thus a slide fastener chain 18, which has a sprue 16 and a runner 17, is continuously manufactured as shown in FIG. 4. The sprue 16 and the runner 17 are separated from the slide fastener chain 18 and are then cut into pieces by a cutting unit 5. In the illustrated embodiment, the sprue 16 and the runner 17 cut into pieces by the cutting unit 5 are returned to the hopper 13 via a regenerative pellet feed pipe 6 by a blowing unit 7 for recycling. Alternatively the cutting unit 5, the regenerative pellet feed pipe 6 and the blowing unit 7 may be omitted, and the sprue 16 and the runner 17 may be cut into pieces by a separate means which is totally independent of the injection molding machine 1.

The automatic color pellet selecting and supplying apparatus of this invention generally comprises an automatic color pellet supply unit 2 located upwardly of the hopper 13 of the injection molding machine 1, and a color pellet storage unit 3 for storing a mass of color pellet to be supplied to the supply unit 2.

The supply unit 2 includes, as shown in FIG. 2, a first auxiliary hopper or chamber 22 and a second auxiliary hopper or chamber 23 located on the upper side and the lower side, respectively, of an automatic change-over valve 21 such as an electromagnetic valve. Each of the first and second auxiliary hoppers 22, 23 has a minimal volume of hollow portion, which volume should depend on the injection molding capacity. The first auxiliary hopper 22 has at its upper end a closure 24, and the second auxiliary hopper 23 has in its lower surface a cleaning air inlet 27 connected to an air suction pipe 26 via an automatic change-over valve 25. Given that the automatic change-over valve 21 is located between the first and second auxiliary hoppers 22, 23, even when the second auxiliary hopper 23 is opened to the hopper 13 of the injection molding machine 1, the first auxiliary hopper 22 imparts an adequate negative pressure effect to draw the pellet by a vacuum pump 9 if the automatic change-over valve 21 is closed. And even when the first auxiliary hopper 22 is under negative pressure, the pellet can be supplied to the hopper 13 of the injection molding machine 1, irrespective of the pellet already supplied into the second auxiliary hopper 23.

The second auxiliary hopper 23 is made from a transparent material such as tempered glass or acryl resin so that the inside can be observed from the outside by naked eyes. Further, by a photoelectric level sensor 29 mounted on the side surface of the second auxiliary hopper 23, it is possible to detect the level of the pellet in the second auxiliary hopper 23 during injection molding so that a non-illustrated control unit issues an instruction for supplying an additional mass of pellet to the second auxiliary hopper 23.

To the closure 24, there are connected a pellet feed pipe 8 for supplying pellet into the first auxiliary hopper 22, and an air suction pipe 91 for drawing air from the first auxiliary hopper 22 by the vacuum pump 9. Near the end of the air suction pipe 91 in the first auxiliary hopper 22, there extends a filter (net) 28 for preventing pellet from being drawn into the air suction pipe 91.

This automatic color pellet supply unit 2 is attached to the closure 19, with the lower end of the second auxiliary hopper 23 being inserted into the hopper 13 of the injection molding machine 1.

The color pellet storage unit 3 includes a number of storage tanks 31a, 31b, . . which are connected to the pellet feed pipe 8 via a number of automatic change-over valves 32a, 32b, . . . , respectively, for respectively storing a cleaning material and a desired number of color pellets of different colors. These storage tanks 31a, 31b, . . . should by no means be located near the injection molding machine 1 and may be located in a remote place, which might be determined depending on the pellet supplying ability. In one storage tank 31a a cleaning material is stored, while in the other storage tanks 31b, 32c, . . . individual pellets of different colors are respectively stored.

The respective upstream ends of the pellet feed pipe 8 of the storage tanks 31a, 31b, . . . are adapted to communicate with the ambient air via the respective automatic change-over valves 33a, 33b, . . . The pellet feed pipe 8 is equipped, on the upstream side of the color pellet storage unit 3, with an automatic change-over valve 82 via which the pellet feed pipe 8 opens at its upstream end to the ambient air. The operations of the individual automatic change-over valves 21, 25, 32a, 32b, . . . 33a, 33b, . . . 82, the vacuum pump 9, etc. are totally controlled according to the program of the non-illustrated control unit.

When a new slide fastener chain of another color is to be manufactured upon termination of injection molding of the previous pellet, firstly the vacuum pump 9 is activated and, at the same time, both the automatic change-over valve 21 between the first and second auxiliary hoppers 22, 23 and the automatic change-over valve 25 at the air inlet 27 of the second auxiliary hopper 23 are opened to draw in air, thus discharging the powdery old pellet, which sticks on the inside walls of the first and second auxiliary hoppers 22, 23, out of the apparatus via the filter 28 and the air suction pipe 91.

Subsequently, both the automatic change-over valves 21, 25 are closed and, at the same time, the automatic change-over valve 32a adapted to communicate with the cleaning material storage tank 31a and the automatic change-over valve 33a adapted to communicate with the ambient air are opened, thus drawing a predetermined mass of cleaning material into the first auxiliary hopper 22 by the vacuum pump 9 for accumulation there. Upon completion of this accumulation, the automatic change-over valves 32a, 33a associated with the storage tank 31a are closed and, at the same time, the automatic change-over valve 21 is opened to supply the cleaning material into the injection cylinder 12, whereupon the injection molding machine is idly operated to clean the residual old pellet in the injection cylinder 12.

Upon termination of this cleaning, both the automatic change-over valves 21, 25 are closed and, at the same time, the automatic change-over valve 32b adapted to communicate with the storage tank 31b for the new pellet corresponding to the color of a new slide fastener chain and the automatic change-over valve 33b adapted to communicate with the ambient air are opened to draw the new pellet into the first auxiliary hopper 22, as shown in FIG. 3, until a predetermined mass of the pellet is accumulated in the lower portion of the first auxiliary hopper 22, whereupon the automatic change-over valves 32a, 33b are automatically closed again. Simultaneously, the automatic change-over valve 21 is opened to supply the new pellet into the injection cylinder 12 via the first auxiliary hopper 23, whereupon injection molding of the new pellet will start.

The amount of the new pellet consumed is monitored by normally detecting the amount of the residual pellet in the second auxiliary hopper 23 by the level sensor 29. When the amount of the residual pellet becomes less than a predetermined value, the non-illustrated control unit is activated to close the automatic change-over valve 21 again and, at the same time, to open the automatic change-over valve 32b of the storage tank 31b and the automatic change-over valve 33b adapted to communicate with the ambient air, thus supplying a predetermined amount of the new pellet to the first auxiliary hopper 22. The foregoing successive operations are repeated to continue the injection molding of the new pellet until a desired quantity of molded article are produced.

In the illustrated embodiment, the sprue 16 and the runner 17 are separated from the thus manufactured product (slide fastener chain) and are then cut into pieces in order by the cutting unit, whereupon the sprue and runner pieces are blown into the hopper 13 of the injection molding machine 1 by a blowing unit 7 so that they will be mixed with a mass of new pellet for recycling.

As a possible modification, a quantitative unit for containing a determined quantity of pellet may be located between the pellet feed pipe 8 and the automatic change-over valve 32a, 32b, . . . of the respective storage tank 31a, 31b, . . . and an automatic change-over valve may be located between the pellet feed pipe 8 and the respective quantitative unit. In this modified example, with the last-named automatic change-over valves closed, the selected automatic change-over valve between the storage tank and the quantitative unit is opened to fill the quantitative unit with pellet. With the quantitative unit fully filled, if the selected automatic change-over valve is closed and, at the same time, an additional automatic change-over valve located on the lower side of the quantitative unit is closed, this predetermined quantity of pellet is supplied to the first auxiliary hopper 22 via the pellet feed pipe.

Thus this invention should by no means be limited to this illustrated embodiment, in which a target product to be molded is a slide fastener chain, and may be applied to the molding of polychromatic articles and accessories.

As is apparent from the foregoing description, since the automatic color pellet supply unit adapted to be installed in the injection molding machine has a very simple structure, such supply unit is easy to set in the injection molding machine. Since the pellet storage units are connected with the supply unit by the pellet feed pipe, they can be installed independently of the injection molding machine so that as many color pellets as necessary can be used. Further since every operation of this apparatus can be controlled by the control unit, such operation can be performed accurately and speedily, thus causing an improved rate of production and making it very advantageous in terms of cost. Flexible manufacturing on a single injection molding machine can be realized.

What is claimed is:

1. An apparatus for automatically selecting one from color pellets of different colors and for automatically supplying the selected one color pellet to an injection molding machine, comprising:
   (a) an auxiliary hopper adapted to be connected to a pellet supply portion of the injection molding machine and divided into two chambers an upstream side chamber and a downstream side chamber, by an automatic change-over valve;
   (b) a negative pressure means for causing said auxiliary hopper, at the upstream side chamber, to be under negative pressure;
   (c) a pellet feed pipe adapted to be connected to the upstream side chamber of said auxiliary hopper; and
   (d) a number of storage tanks for storing the respective color pellets, each of said storage tanks being adapted to be connected to said pellet feed pipe via a respective automatic change-over valve.

2. An apparatus according to claim 1, wherein said auxiliary hopper has at a junction with said negative pressure means a filter.

3. An apparatus according to claim 1, wherein the downstream side chamber of said auxiliary hopper communicates with the ambient air.

4. An apparatus according to claim 2, wherein the downstream side chamber of said auxiliary hopper communicates with the ambient air.

* * * * *